US012731195B2

(12) United States Patent
Twigger

(10) Patent No.: US 12,731,195 B2
(45) Date of Patent: Sep. 8, 2026

(54) CHARGING MANAGEMENT FOR ELECTRIC WORK VEHICLES WITH VEHICLE-TO-VEHICLE NEGOTIATION

(71) Applicant: Caterpillar Inc., Peoria, IL (US)

(72) Inventor: Thomas L. Twigger, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 18/715,939

(22) PCT Filed: Nov. 22, 2022

(86) PCT No.: PCT/US2022/080306
§ 371 (c)(1),
(2) Date: Jun. 3, 2024

(87) PCT Pub. No.: WO2023/102335
PCT Pub. Date: Jun. 8, 2023

(65) Prior Publication Data
US 2024/0394811 A1 Nov. 28, 2024

(30) Foreign Application Priority Data
Dec. 3, 2021 (GB) ..................................... 2117525

(51) Int. Cl.
*G06Q 50/06* (2024.01)
*B60L 53/62* (2019.01)
(Continued)

(52) U.S. Cl.
CPC .............. *G06Q 50/06* (2013.01); *B60L 53/62* (2019.02); *B60L 53/63* (2019.02); *B60L 53/66* (2019.02);
(Continued)

(58) Field of Classification Search
CPC ..................................................... G06Q 50/06
See application file for complete search history.

(56) References Cited

U.S. PATENT DOCUMENTS 11,124,080 B2 * 9/2021 Donnelly ................ B60L 53/36
11,148,542 B2 * 10/2021 Donnelly ............... B60L 53/36
(Continued)

FOREIGN PATENT DOCUMENTS

CN 110435474 A 11/2019
DE 102017128590 A1 6/2019
(Continued)

OTHER PUBLICATIONS

International Search Report related to Application No. PCT/US2022/080306; reported on Mar. 28, 2023.
(Continued)

*Primary Examiner* — Jeff Zimmerman

(57) ABSTRACT

A method of charger management for electric work vehicles comprises communicating charger properties from a charging module to a first controller and communicating vehicle properties from the electric work vehicle to a second controller. A charging decision is made based on the charger properties and the vehicle properties, wherein the charging decision is made by a third controller. In an event that the charging decision comprises a decision to charge the vehicle, an operator is notified of the charging decision, a charging schedule is negotiates with the charging module and at least one other electric work vehicle, and the charging module is reserved. The charger properties comprise a location of the charging module and an availability of the charging module. The vehicle properties comprise a current state of charge of a battery of the electricwork vehicle and a capacity of the battery.

20 Claims, 4 Drawing Sheets

(51) Int. Cl.

| | |
|---|---|
| ***B60L 53/63*** | (2019.01) |
| ***B60L 53/66*** | (2019.01) |
| ***G06Q 10/0631*** | (2023.01) |
| *B60L 58/16* | (2019.01) |

(52) U.S. Cl.

CPC ........ *G06Q 10/06314* (2013.01); *B60L 58/16* (2019.02); *B60L 2200/40* (2013.01)

(56) References Cited

U.S. PATENT DOCUMENTS

| | | | | |
|---|---|---|---|---|
| 11,820,246 | B2 * | 11/2023 | Donnelly | B60L 53/36 |
| 2012/0233077 | A1 * | 9/2012 | Tate, Jr. | G06Q 10/20 705/65 |
| 2018/0340793 | A1 | 11/2018 | Wilcox | |
| 2019/0202315 | A1 | 7/2019 | Wilding et al. | |
| 2019/0217735 | A1 * | 7/2019 | Donnelly | B60L 53/36 |
| 2020/0269717 | A1 * | 8/2020 | Gaertner | B60L 53/63 |
| 2021/0086651 | A1 | 3/2021 | Maeda et al. | |
| 2021/0316713 | A1 | 10/2021 | Vilar et al. | |

FOREIGN PATENT DOCUMENTS

| | | | |
|---|---|---|---|
| EP | 3381735 | A1 | 10/2018 |
| GB | 2592644 | A | 9/2021 |

OTHER PUBLICATIONS

GB Search Report related to Application No. 2117525.2; reported on Jun. 1, 2022.

International Preliminary Report on Patentability related to Application No. PCT/US2022/080306; reported on Mar. 5, 2024.

* cited by examiner

CHARGING MANAGEMENT FOR ELECTRIC WORK VEHICLES WITH VEHICLE-TO-VEHICLE NEGOTIATION

CROSS-REFERENCE TO RELATED APPLICATION

This Application is a 35 USC § 371 US National Stage filing of International Application No. PCT/US2022/080306 filed on Nov. 22, 2022 which claims priority under the Paris Convention to Great Britain Patent Application No. 2117525.2 filed on Dec. 3, 2021.

FIELD OF THE DISCLOSURE

The disclosure relates to the field of electric work vehicles.

BACKGROUND

Large worksites typically have more than one charging point for electric work vehicles. The charging points may be at the same location or at different locations.

An operator of an electric work vehicle may not know the location of the charging points, particularly if the charging point locations vary between worksites or if the charging points are mobile. The operator may waste time and charge travelling to look for a charging point.

An operator of a work vehicles may travel to a charging point in order to charging without knowledge of any properties of the charging point, and so risk not being able to charge. For example, the charging point may be in use by another vehicle, low on charge or power, out of order, the wrong type of charging point, or otherwise unusable. In the event that an electric work vehicle cannot charge at the charging point, the electric work vehicle may be required to wait or to travel to a different charging point. Charging an electric work vehicle takes time, so if a charger is in use by an electric work vehicle it may be unusable by other electric work vehicles for a substantial amount of time. Problems may arise where electric work vehicles with urgent jobs cannot charge because other electric work vehicles are occupying chargers.

SUMMARY OF THE DISCLOSURE

A method of charger management for electric work vehicles is provided. The method comprises communicating charger properties from a charging module to a first controller. The method further comprises communicating vehicle properties from the electric work vehicle to a second controller. The method further comprises making a charging decision based on the charger properties and the vehicle properties, wherein the charging decision is made by a third controller. In an event that the charging decision comprises a decision to charge the vehicle the method further comprises notifying an operator of the charging decision; negotiating a charging schedule with the charging module and at least one other electric work vehicle; and reserving the charging module. The charger properties comprise location of the charging module and availability of the charging module. The vehicle properties comprise a current state of charge of a battery of the electric work vehicle and a capacity of the battery.

A charging management device for electric work vehicles is provided. The charging management device is configured to communicate charger properties from a charging module to a first controller. The charging management device is further configured to communicate vehicle properties from the electric work vehicle to a second controller. The charging management device is further configured to make a charging decision based on the charger properties and the vehicle properties, wherein the charging decision is made by a third controller and wherein the charging management device comprises the third controller. In an event that the charging decision comprises a decision to charge the vehicle the charging management device is further configured to notify an operator of the charging decision; negotiate a charging schedule with the charging module and at least one other electric work vehicle; and reserve the charging module. The charger properties comprise location of the charging module and availability of the charging module. The vehicle properties comprise a current state of charge of a battery of the electric work vehicle and a capacity of the battery.

In this way, a charging schedule may be negotiated for more than one electric work vehicle such that the electric work vehicles do not need to travel to the charging module before their position in the charging schedule. The charging schedule may be such that the electric vehicles do not fall below a threshold state of charge. The charging schedule may prevent queuing at charging modules, and may prevent electric work vehicles from travelling to a charging module that is in use or experiencing issues. This minimises time wasted by the electric work vehicles looking for or waiting for a charger, and aims to ensure that the electric work vehicles have sufficient state of charge to keep working until their charge.

BRIEF DESCRIPTION OF THE DRAWINGS

A specific embodiment of the disclosure will now be described, by way of example only, with reference to the accompanying drawings in which.

DETAILED DESCRIPTION

Figure 1:
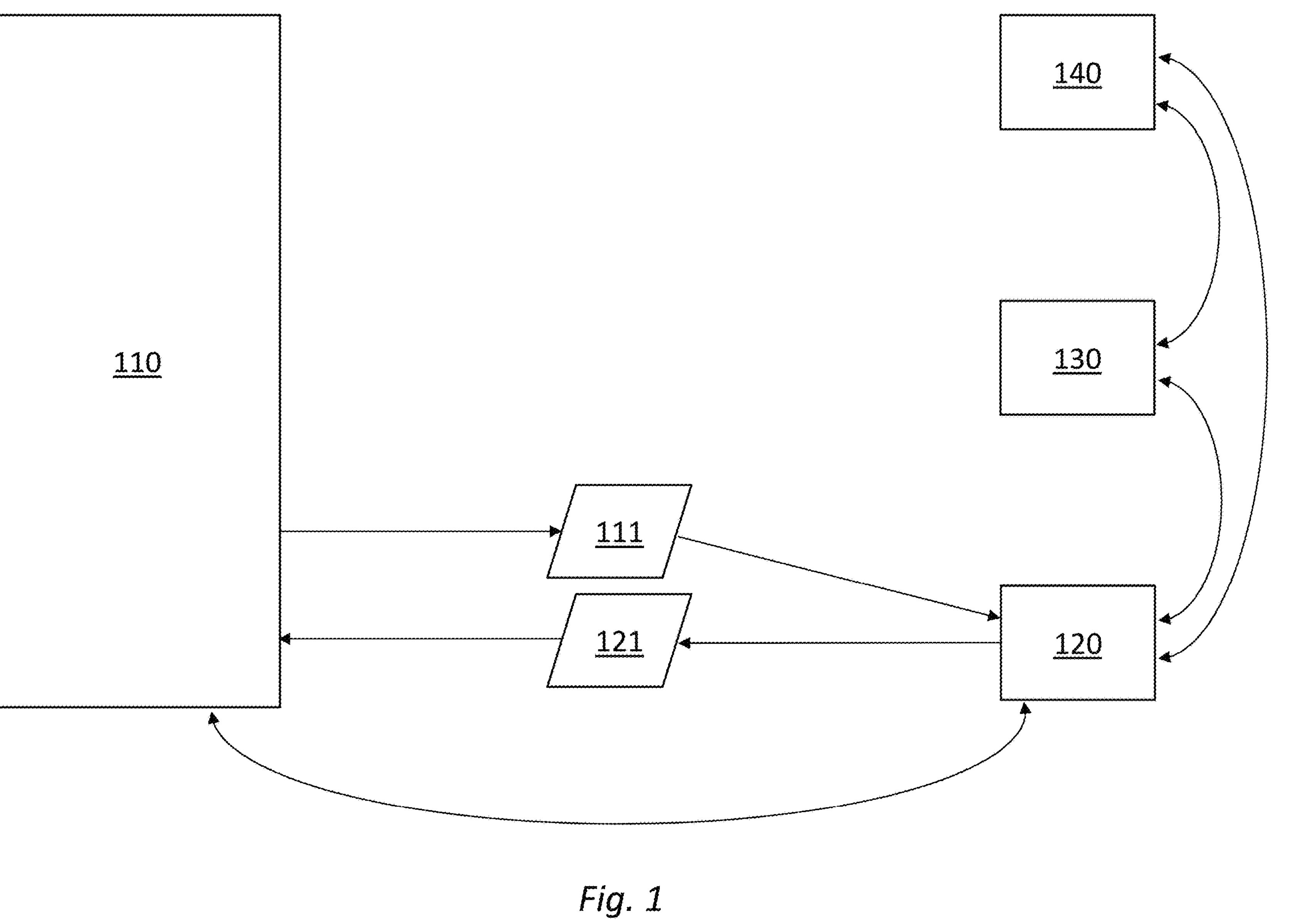
FIG. 1 shows a schematic diagram illustrating communication between a charging module and an electric work vehicle, and negotiation between the electric work vehicle and at least one other electric work vehicle in accordance with an embodiment of the present disclosure.

With reference to FIG. 1, a method of charger management for electric work vehicles comprises communicating charger properties 111 from a charging module 110 to first controller and communicating vehicle properties 121 from the electric work vehicle 120 to a second controller. A charging decision is made by a third controller based on the charger properties 111 and the vehicle properties 121. The electric work vehicle 120 may comprise the first controller.

The charging module 110 may comprise the second controller. A main controller may comprise at least two of the first controller, the second controller and the third controller.

In an event that the charging decision comprises a decision to charge the vehicle, an operator of the vehicle is notified of the charging decision. A charging schedule is negotiated with the charging module 110 and at least one other electric work vehicle. The charging schedule may comprise a charging time for each electric work vehicle. FIG. 1 illustrates an example with two other electric work vehicles 130 and 140, with the negotiation illustrated by curved arrows. There may be one other electric work vehicle, or more than two other electric work vehicles. The charging module 110 is reserved according to the charging schedule.

The decision to charge the electric work vehicle 120 may comprise a decision that the electric work vehicle 120 needs to be charged imminently. The decision to charge the electric work vehicle 120 may comprise determining a time at which it is predicted that the state of charge of the battery will fall below a threshold charge, and therefore a time by which the electric work vehicle 120 preferably needs to begin its charge.

Negotiation of the charging schedule may comprise determining the order in which the electric work vehicles will be charged. The negotiation may be based on the current state of charge of each electric work vehicle, wherein the resulting charging schedule is such that the electric work vehicles are unlikely to run out of charge before their charging time. The negotiation may be further based on the distance of each electric work vehicle to the charging module. The negotiation may be further based on the expected time until each electric work vehicle will fall below a threshold state of charge. The expected time may be based on one or more of the current state of charge of the electric work vehicle, historical data regarding discharge speed, and the type of work the electric work vehicle is carrying out. The negotiation may be further based on the length of charging that each electric work vehicle is expected to require. The charging schedule may order the charging times of the electric work vehicles in order of ascending current state of charge (or expected time until each electric work vehicle falls below a threshold state of charge). The charging schedule may order the charging times differently. For example, a charging time may be brought forward if the electric work vehicle is close to the charging module or if the length of charging time for an electric work vehicle is short.

The other electric work vehicles may also communicate vehicle properties to the charging module and receive charger properties from the charging module.

Charger properties from more than one charger module may be communicated to the electric work vehicle. The charging schedule may further comprise a location of a charger module that an electric work vehicle should travel to at its charging time.

The charger properties 111 comprise a location of the charging module 110 and an availability of the charging module 110. The vehicle properties comprise a current state of charge of a battery of the electric work vehicle 120 and a capacity of the battery.

Figure 2:
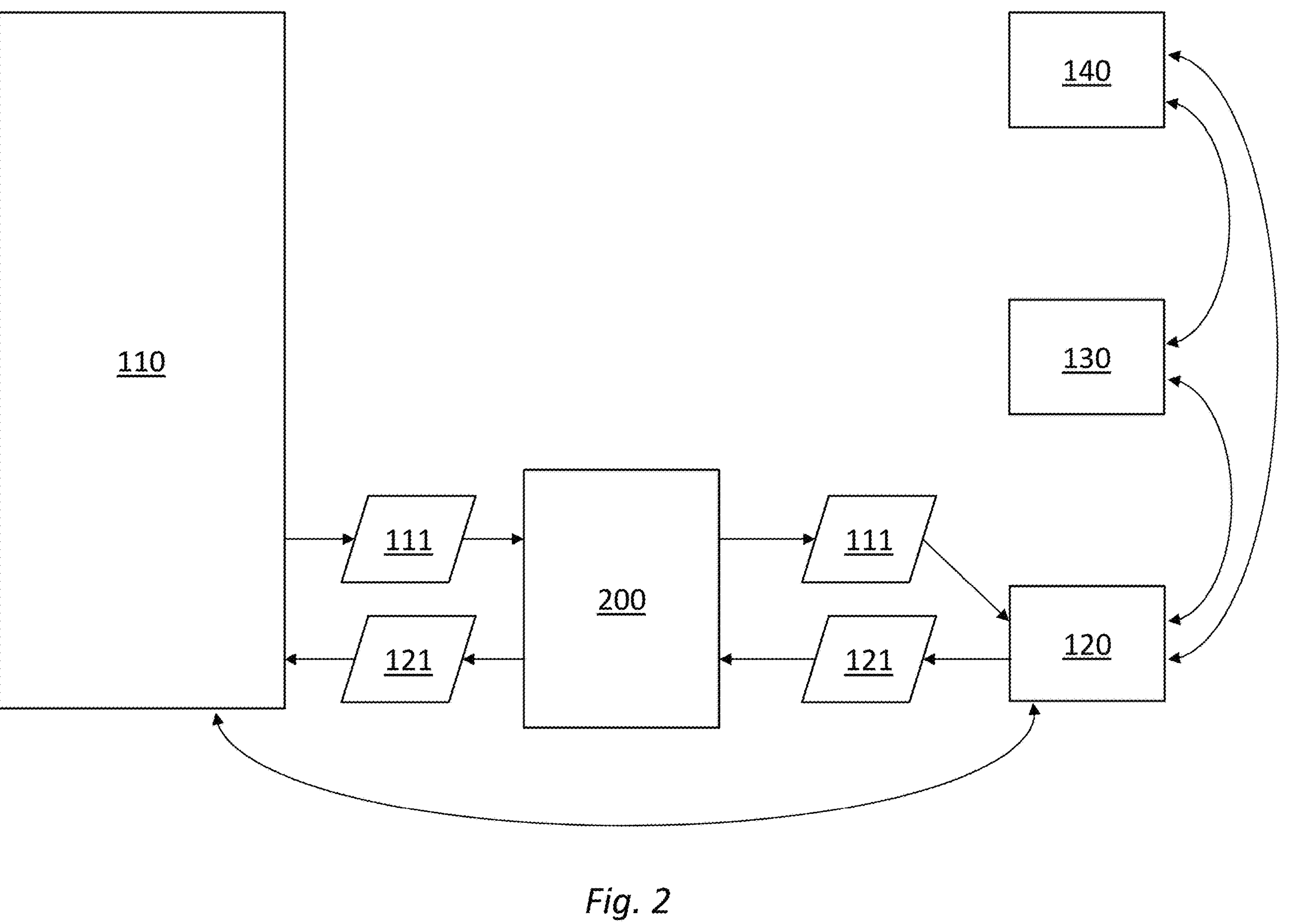
FIG. 2 shows a schematic diagram illustrating communication between a charging module and an electric work vehicle via a central controller, and negotiation between the electric work vehicle and at least one other electric work vehicle in accordance with an embodiment of the present disclosure.

Communicating charger properties 111 to the electric work vehicle 120 and communicating vehicle properties 121 to the charging module 110 may occur at the same time, or sequentially in either order. The charger properties 111 and vehicle properties 121 may be communicated continuously or at regular intervals. The charger properties 111 and vehicle properties 121 may alternatively be communicated on demand, for example in response to a request by an operator. The charger properties 111 and vehicle properties 121 may be communicated directly between the charging module 110 and the electric work vehicle 120. With reference to FIG. 2, the charger properties 111 and vehicle properties 121 may be communicated between the charging module 110 and the electric work vehicle 120 via a central controller 200 (also referred to as a main controller). FIG. 2 shows the charger properties 111 being communicated from the central controller 200 to the electric work vehicle 120, and the vehicle properties being communicated from the central controller 200 to the charging module 110.

In another embodiment, the central controller 200 may comprise the first controller and the second controller, such that the charger properties 111 may be communicated to the central controller 200 but not communicated to the electric work vehicle 120. The vehicle properties 121 may be communicated to the central controller 200 but not communicated to the charging module 110. The charging schedule may then be communicated to at least one of the electric work vehicle 120 and the charging module 110.

Figure 3:
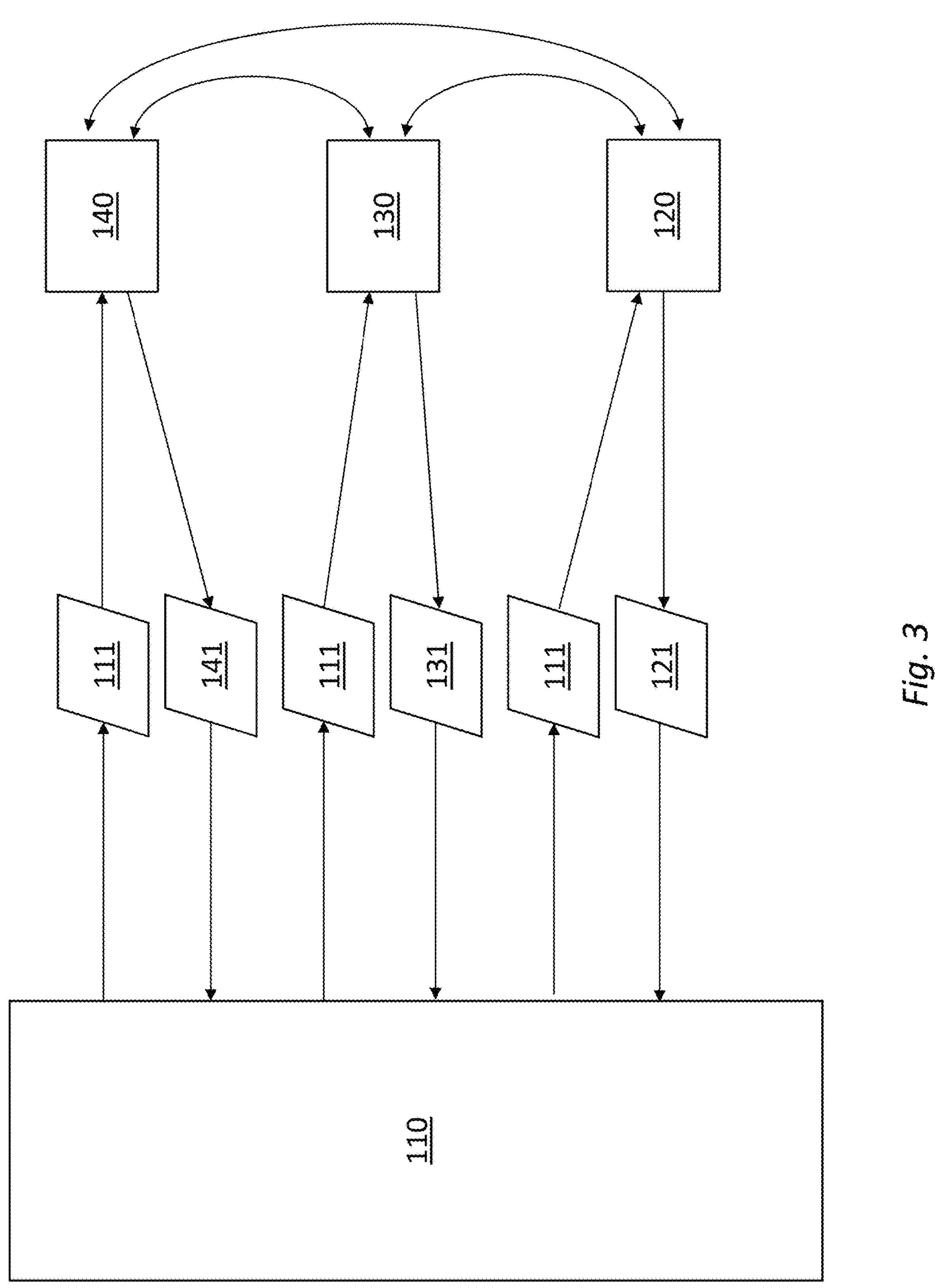
FIG. 3 shows a schematic diagram illustrating communication between a charging module and three electric work vehicles, and negotiation between the electric work vehicles in accordance with an embodiment of the present disclosure.
Figure 4:
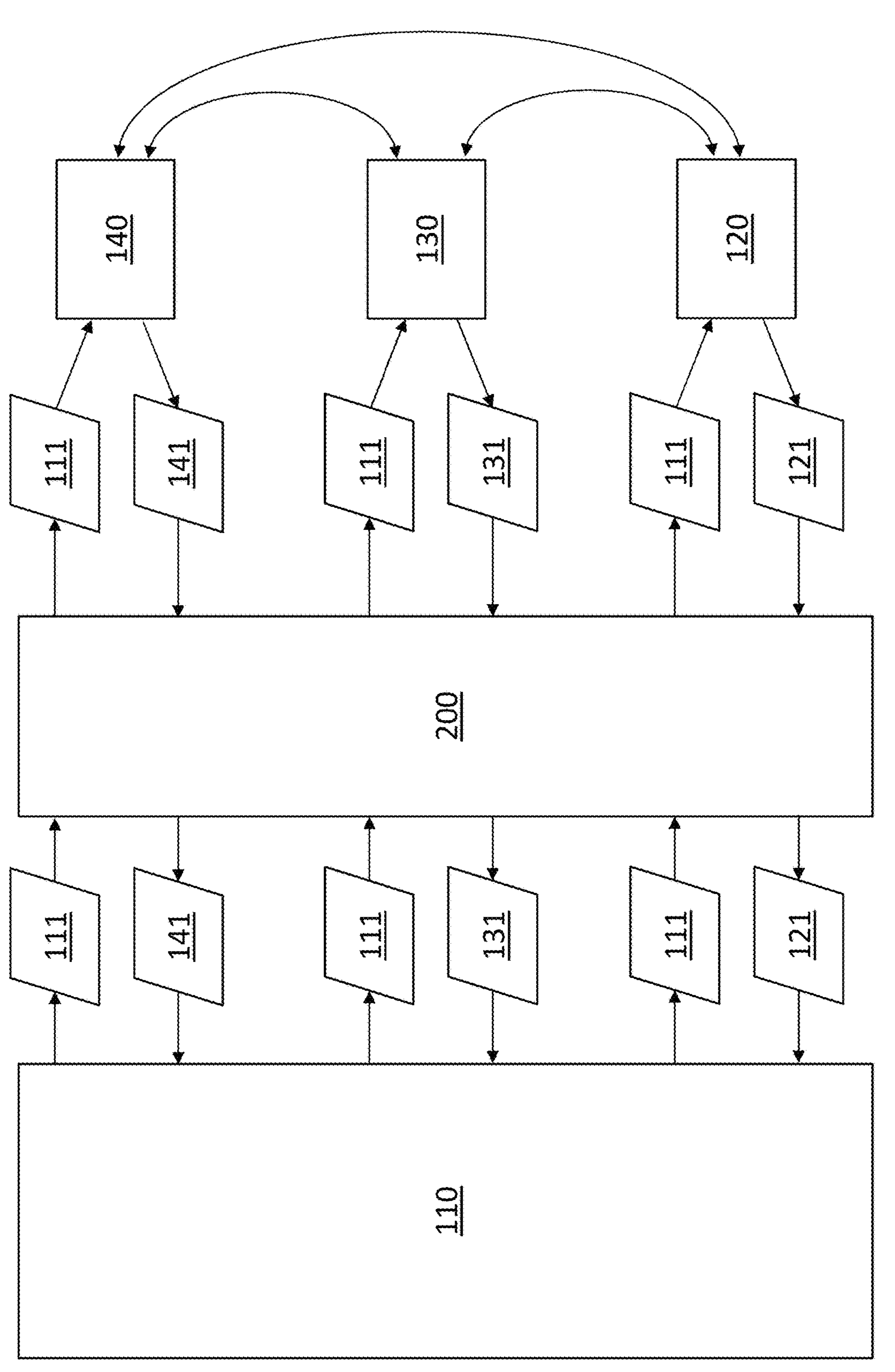
FIG. 4 shows a schematic diagram illustrating communication between a charging module and three electric work vehicles via a central controller, and negotiation between the electric work vehicles in accordance with an embodiment of the present disclosure.

With reference to FIGS. 3 and 4, charger properties 111 may be further communicated from the charging module 110 to the at least one other electric work vehicle (FIGS. 3 and 4 illustrate an example with two other electric work vehicles 130 and 140) either directly, as shown in FIG. 3, or via the central controller 200, as shown in FIG. 4. Vehicle properties (shown as 131 and 141) for the at least one other electric work vehicle (shown as 130 and 140) may be communicated from the at least one other electric work vehicle 130, 140 to the charging module 110 either directly or via the central controller 200.

As descried above, the charging decision is made by a third controller. The third controller may be on the electric work vehicle 120, or may be the central controller 200 or another controller. In an embodiment, negotiating the charging schedule may carried out by one of the first controller, the second controller, the third controller or another controller. In another embodiment, negotiating the charging schedule may be carried out by the operator.

In an embodiment, the charging schedule may be communicated to an operator, and the operator may then carry out the step of reserving the charging module based on the charging schedule. In another embodiment, the step of reserving the charging module may be carried out by one of the first controller, the second controller, the third controller or another controller. The third controller may be on the electric work vehicle 120, may be the central controller, or may be another controller.

In an embodiment, the operator may be notified of the results of at least one of negotiating a charging schedule and reserving the charging module.

The charging schedule may based on a priority assigned to each electric work vehicle. The priority assigned to each electric work may be based on one or more of a return-to-work time of each electric work vehicle, a state of charge of the battery of each electric work vehicle, or other factor associated with the urgency of the charge. For example, the priority may depend on the current state of charge of the battery, and therefore the remaining run time of the electric work vehicle. The priority may also depend on the difference between the target state of charge and the current state of charge—for example, an electric work vehicle requiring a short charge may be scheduled before an electric work vehicle requiring a long charge. An example of this situation might be an electric work vehicle requiring a short charge in order to finish a shift, which would be given higher priority than an electric work vehicle requiring a long charge that has finished a shift. In another example, the work of certain electric work vehicles may be considered more important than others.

The charging schedule may be based on one or more of a duration of charge required for each electric work vehicle, a proximity of each electric work vehicle to the charging module, and an available amount of charge of the charging module.

The charging module 110 and the electric work vehicle 120 may each comprise a telematics module. The telematics modules may be configured to send and receive the charger properties 111 and the vehicle properties 121.

The charging module 110 may comprise a mains supply, or may not be connected to the mains supply. The charging module 110 may comprise a power pack. The charging module 110 may comprise a generator.

The charger properties 111 may further comprise a health status of the charging module 110. For example, whether the charging module 110 is working, and whether there is any damage to the charging module 110 or limited capability of the charging module 110. The charger properties 111 may further comprise a charging capacity of the charging module 110. For example, in the event that the charging module 110 is not connected to the mains supply, it may have a limited amount of charge available. The charging capacity may comprise a state of charge of power pack. In an embodiment, the charging capacity may comprise either an indication that the charging module 110 has sufficient charge to fully charge the battery, or an indication of the predicted state of charge of the battery after fully draining the charging module 110. The charger properties 111 may further comprise a charging rate of the charging module 110, and a charger connection type (such as DC, AC, three phase).

The charger properties 111 comprise an availability of the charging module. The availability of the charging module may comprise an indication of whether the charging module 110 is in use and a reservation status of the charging module 110. For example, the charging module 110 may be currently in use, currently free, reserved for use at a certain time by another vehicle, or unreserved. In an event that the charging module 110 is in use, the availability of the charging module may further comprise a predicted charging end time at which the charging module 110 will be available. Similarly, in an event that the charging module 110 is reserved, the availability of the charging module may further comprise a period when the charging module 110 is free prior to the reservation and/or a predicted end time of the reservation.

The predicted charging end time may be communicated from the charging module 110 to the electric work vehicle 120. The predicted charging end time may be calculated by the electric work vehicle 120 or central controller based on a current state of charge of the battery being charged, a target state of charge of the battery being charged, and a charging rate of the charging module 110. In an event that the charging module 110 is not connected to the mains supply, the charger properties 111 may further comprise a predicted state of charge of the charging module 110 at the predicted charging end time.

In an embodiment, the charging module 110 may comprise a DC charger and the charger properties 111 may further comprise a DC voltage of the charging module 110.

The vehicle properties 121 may further comprise a predicted time before charging is required. The predicted time may be based on at least one of a current state of charge, a discharge rate, and a distance from the charging module 110. The discharge rate may be based on a current discharge rate. The discharge rate may be based on data from previous discharging of the battery, for example data comprising discharge rates at different states of charge, or discharge rates for the operator, or discharge rates for performing various tasks with the vehicle. The distance from the charging module 110 may be used to calculate the state of charge required to travel to the charging module 110, and therefore the minimum state of charge that the vehicle can reach before needing to travel to the charging module 110.

The vehicle properties 121 may further comprise an available time period for charging. The available time may be based on a return-to-work time for the vehicle. For example, the vehicle may be charged at the end of an operator's shift, and the return-to-work time may comprise the beginning of the next shift for the vehicle (for the same or a different operator). Otherwise, an available time period may comprise a lunch break of the operator, a weekend, a closed period of the worksite, or other time period.

The vehicle properties 121 may further comprise a target state of charge for charging. For example, the target state of charge may be to fully charge the battery to a 100% state of charge. The target state of charge may comprise a state of charge that has been determined to be appropriate to maintain good battery health. The target state of charge may be the state of charge required to complete the next task or the next shift.

The vehicle properties 121 may further comprise at least one of a battery voltage, a maximum charge rate of the battery, a state of health of the battery, and a temperature of the battery.

The charging module may comprise a geofence. The geofence may define a perimeter around the charging module, for example based on a radius from the charging module. Within the geofence, a speed of the electric work vehicle 120 may be limited to below a threshold speed, and/or the electric work vehicle 120 may be limited in the tasks it can perform. There may be other limitations, such as the number of electric work vehicles permitted to be within the geofence at any one time The charger properties 111 may further comprise the geofence and any limitations on the electric work vehicle 120 that occur within the geofence.

In an embodiment, the charging information provided to the operator may comprise information to allow the operator to make an informed charging decision. For example, the charging information may comprise the predicted time before charging is required and distances to available charging modules. In another embodiment, the charging information provided to the operator may comprise a result of a charging decision made by a controller (either the central controller or a controller of the electric work vehicle 120). For example, the controller may decide which charging module the electric work vehicle 120 should travel to, and when the electric work vehicle 120 should travel to or arrive at the charging module.

The method may further comprise making a reservation of the charging module. The reservation may be made by the operator based on the charging information. The reservation may be suggested to the operator by a controller based on a charging decision made by the controller, and the operator may confirm or reject the reservation. The reservation may be made by a controller based on a charging decision made by the controller, without input from the operator.

The method of charging management may comprise communicating charger properties 111 from a plurality of charging modules to an electric work vehicle 120. The charging information may be based on the charger properties 111 for the plurality of charging modules, such that the charging decision (made by the operator or a controller) comprises a decision of whether or when to charge the electric work vehicle 120, and which charging module to use.

The electric work vehicle 120 may communicate its charging schedule to other electric work vehicles, for example to alert vehicles that a charger will be in use in the near future. The electric work vehicle may set up a geofence (such as that described above) by communicating to nearby vehicles that it is charging. An electric work vehicle travelling to a charging module may alert an electric work vehicle that is currently charging at the charging module, and may provide an estimated time of arrival at the charging module.

According to an embodiment, there is a charging management device for electric work vehicles. The charging management device is configured to communicate charger properties 111 from a charging module 110 to a first controller and communicate vehicle properties 121 from the electric work vehicle 120 to a second controller. A charging decision is made by a third controller based on the charger properties 111 and the vehicle properties 121. The electric work vehicle 120 may comprise the first controller. The charging module 110 may comprise the second controller. A main controller may comprise at least two of the first controller, the second controller and the third controller.

In an event that the charging decision comprises a decision to charge the vehicle, an operator of the vehicle is notified of the charging decision. A charging schedule is negotiated with the charging module 110 and at least one other electric work vehicle. The charging schedule may comprise a charging time for each electric work vehicle. FIG. 1 illustrates an example with two other electric work vehicles 130 and 140, with the negotiation illustrated by curved arrows. There may be one other electric work vehicle, or more than two other electric work vehicles. The charging module 110 is reserved according to the charging schedule.

The charging management device may be configured to carry out any of the methods described above. The charging management device may comprise a controller (either a central controller or a controller on the electric work vehicle 120). The charging management device may comprise a telematics device on the charging module, and a telematics device on the electric work vehicle 120.

The invention claimed is:

1. A method of charger management for electric work vehicles, the method comprising:

receiving vehicle properties from a first electric work vehicle;

making a charging decision based on charger properties and the vehicle properties;

negotiating a charging schedule with the first electric work vehicle;

reserving a charging module for the first electric work vehicle based on the charging schedule; and upon the first electric work vehicle arriving at the charging module, setting up a geofence around the charging module, the geofence preventing additional electric work vehicles to enter the geofence while the first electric work vehicle is charging;

wherein the charger properties comprise: a location of the charging module; and an availability of the charging module; and wherein the vehicle properties comprise: a current state of charge of a battery of the first electric work vehicle; or a capacity of the battery.

2. The method of claim 1, wherein the first electric work vehicle comprises a first controller and/or the charging module comprises a second controller.

3. The method of claim 2, wherein negotiating the charging schedule is carried out by one of the first controller, the second controller, a third controller, or a fourth controller.

4. The method of claim 3, wherein the charging schedule is communicated to an operator, and the operator carries out the step of reserving the charging module based on the charging schedule.

5. The method of claim 3, wherein reserving the charging module is carried out by one of the first controller, the second controller, the third controller, or the fourth controller.

6. The method of claim 3, further comprising notifying an operator of the results of at least one of the negotiating the charging schedule or reserving the charging module.

7. The method of claim 1, wherein negotiating the charging schedule is carried out by an operator.

8. The method of claim 1, wherein a first controller is separate to the first electric work vehicle.

9. The method of claim 1, wherein a main controller comprises at least two of a first controller, a second controller and a third controller.

10. The method of claim 1, wherein negotiating the charging schedule is based on at least one of:

a priority assigned to the first electric work vehicle and a second electric work vehicle;

a duration of charge required for the first electric work vehicle and the second electric work vehicle;

a proximity of the first electric work vehicle and the second electric work vehicle to the charging module; or an available amount of charge of the charging module.

11. The method of claim 10, wherein the priority assigned to the first electric work vehicle and the second electric work vehicle is based on at least one of:

a return to work time of the first electric work vehicle and the second electric work vehicle; or a state of charge of the battery of the first electric work vehicle and the second electric work vehicle.

12. The method of claim 1, wherein the charger properties further comprise at least one of:

a health status of the charger;

a charging capacity of the charger;

a charging rate; or a charger connection type.

13. The method of claim 1, wherein the availability of the charging module comprises at least one of:

an indication of whether the charger is in use; or a reservation status of the charger.

14. The method of claim 1, wherein the vehicle properties further comprise at least one of:

a predicted time before charging is required;

an available time period for charging;

a target state of charge of the battery;

a battery voltage;

a maximum charge rate of the battery;

a state of health of the battery; or a temperature of the battery.

15. A charging management device for a first electric work vehicle, wherein the charging management device is configured to:

receive vehicle properties from the first electric work vehicle;

make a charging decision based on charger properties and the vehicle properties;

negotiate a charging schedule with the first electric work vehicle;

reserve a charging module for the first electric work vehicle based on the charging schedule; and upon the first electric work vehicle arriving at the charging module, setting up a geofence around the charging module, the geofence preventing additional electric work vehicles to enter the geofence while the first electric work vehicle is charging;

wherein the charger properties comprise: a location of the charging module; and an availability of the charging module; and wherein the vehicle properties comprise: a current state of charge of a battery of the first electric work vehicle; or a capacity of the battery.

16. The charging management device of claim 15, wherein the charging schedule is based on a priority assigned to the first electric work vehicle and a second electric work vehicle, a duration of charge required for the first electric work vehicle and the second electric work vehicle, and a proximity of the first electric work vehicle and the second electric work vehicle to the charging module.

17. The charging management device of claim 15, wherein the availability of the charging module comprises at least one of:

an indication of whether the charger is in use; or a reservation status of the charger.

18. The charging management device of claim 15, wherein the charger properties further comprise at least one of:

a health status of the charger;

a charging capacity of the charger;

a charging rate; or a charger connection type.

19. The charging management device of claim 15, wherein the availability of the charging module comprises at least one of:

an indication of whether the charger is in use; or a reservation status of the charger.

20. The charging management device of claim 15, wherein the vehicle properties further comprise at least one of:

a predicted time before charging is required;

an available time period for charging;

a target state of charge of the battery;

a battery voltage;

a maximum charge rate of the battery;

a state of health of the battery; or a temperature of the battery.

* * * * *